(12) United States Patent
Huang et al.

(10) Patent No.: US 12,145,889 B2
(45) Date of Patent: Nov. 19, 2024

(54) CARBON NITRIDE BASED COMPOSITE CERAMIC TOOL MATERIALS, PREPARATION METHOD AND CUTTING TOOL THEREOF

(71) Applicants: SHANDONG UNIVERSITY, Shandong (CN); YANSHAN UNIVERSITY, Hebei (CN)

(72) Inventors: Chuanzhen Huang, Qinhuangdao (CN); Yan Zhang, Jinan (CN); Hanlian Liu, Jinan (CN); Zhenyu Shi, Jinan (CN); Peng Yao, Jinan (CN); Zhen Wang, Qinhuangdao (CN); Longhua Xu, Qinhuangdao (CN); Shuiquan Huang, Qinhuangdao (CN); Jun Wang, Jinan (CN); Hongtao Zhu, Jinan (CN); Bin Zou, Jinan (CN)

(73) Assignees: SHANDONG UNIVERSITY, Jinan (CN); YANSHAN UNIVERSITY, Qinhuangdao (CN)

( * ) Notice: Subject to any disclaimer, the term of this patent is extended or adjusted under 35 U.S.C. 154(b) by 131 days.

(21) Appl. No.: 17/706,045

(22) Filed: Mar. 28, 2022

(65) Prior Publication Data
US 2023/0219856 A1 Jul. 13, 2023

(30) Foreign Application Priority Data
Jan. 11, 2022 (CN) .......................... 202210026265.3

(51) Int. Cl.
| | |
|---|---|
| C04B 35/58 | (2006.01) |
| B23B 27/14 | (2006.01) |
| C04B 35/626 | (2006.01) |
| C04B 35/645 | (2006.01) |

(52) U.S. Cl.
CPC ............ *C04B 35/58* (2013.01); *B23B 27/148* (2013.01); *C04B 35/6261* (2013.01); *C04B 35/6264* (2013.01); *C04B 35/645* (2013.01); *B23B 2226/18* (2013.01); *C04B 2235/3856* (2013.01); *C04B 2235/3886* (2013.01); *C04B 2235/404* (2013.01); *C04B 2235/405* (2013.01); *C04B 2235/6562* (2013.01); *C04B 2235/6567* (2013.01); *C04B 2235/6581* (2013.01)

(58) Field of Classification Search
CPC . C04B 35/58; C04B 35/6261; C04B 35/6264; C04B 35/645; C04B 2235/3856; C04B 2235/3886; C04B 2235/404; C04B 2235/405; C04B 2235/6562; C04B 2235/6567; C04B 2235/6581; C04B 35/58021; B23B 27/148; B23B 2226/18
See application file for complete search history.

(56) References Cited

U.S. PATENT DOCUMENTS

| | | | |
|---|---|---|---|
| 2013/0029175 A1* | 1/2013 | Umemura | ............. C04B 35/581 428/627 |
| 2018/0036806 A1* | 2/2018 | Michiuchi | ................. B22F 3/24 |

* cited by examiner

*Primary Examiner* — Pegah Parvini
(74) *Attorney, Agent, or Firm* — Oliff PLC

(57) ABSTRACT

The present invention relates to the field of new materials technology, in particular to carbon nitride composite ceramic tool materials, preparation method and cutting tools thereof. The raw materials comprise carbon nitride, titanium carbonitride, molybdenum, nickel and cobalt, carbon nitride as the matrix phase, titanium carbonitride as the reinforcing phase are added to the carbon nitride based composite ceramic materials, with molybdenum, nickel and cobalt as a suitable sintering aid, dense composite tool material is obtained with vacuum hot press sintering method. The prepared carbon nitride based composite ceramic tool materials boast the advantages of low cost, high hardness, high bending strength and high fracture toughness, which is an important way to promote the innovation, development and popularization of carbon nitride materials.

12 Claims, 1 Drawing Sheet

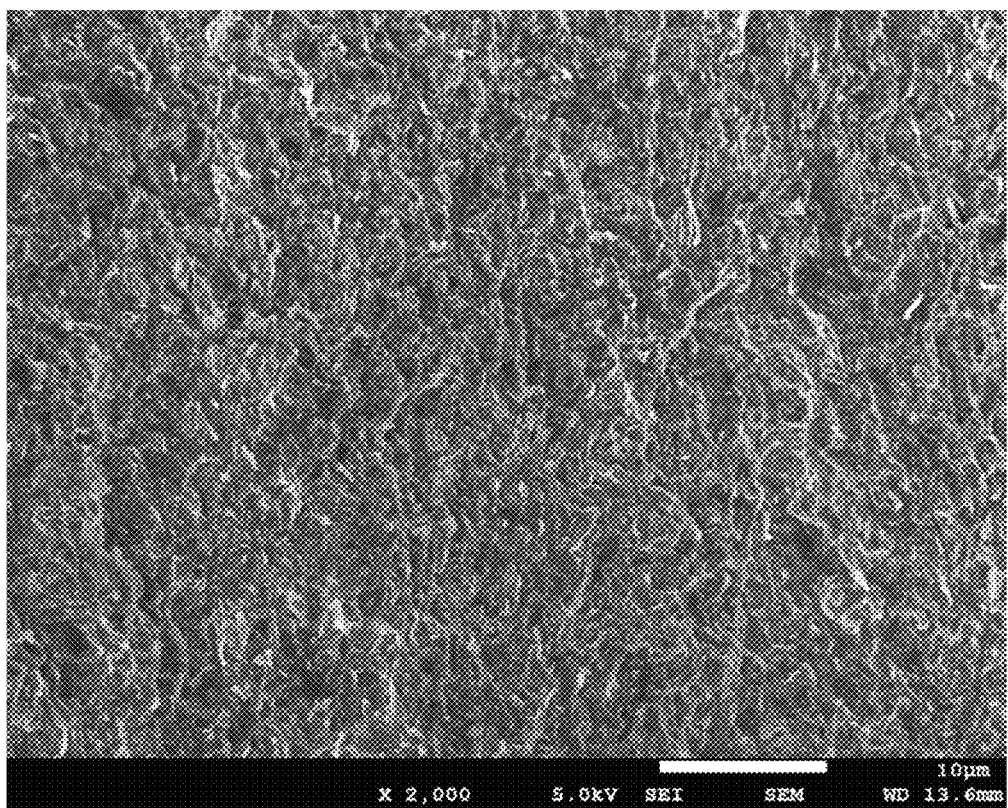

CARBON NITRIDE BASED COMPOSITE CERAMIC TOOL MATERIALS, PREPARATION METHOD AND CUTTING TOOL THEREOF

TECHNICAL FIELD

The present invention relates to the field of new materials technology, in particular to carbon nitride based composite ceramic tool materials, preparation method and cutting tool thereof.

BACKGROUND

Information of the Related Art part is merely disclosed to increase the understanding of the overall background of the present invention, but is not necessarily regarded as acknowledging or suggesting, in any form, that the information constitutes the prior art known to a person of ordinary skill in the art.

According to the inventor's research, carbon nitride is at present used merely as a coating in the field of cutting tools. Carbon nitride coated cutting tools are with high surface hardness, significantly prolonged service life and are suitable for high speed finishing, but when the coating breaks down the cutting performance of the tool decreases significantly. Carbon nitride has a high melting point, high hardness, and excellent chemical stability, but its sintering performance as a matrix phase is poor.

SUMMARY

In response to the problems in the prior art, the present invention provides carbon nitride composite ceramic tool materials, preparation method and cutting tool thereof. A prepared carbide nitride based composite ceramic tool materials boast advantages of low cost, high hardness, high bending strength and high fracture toughness, which is an important way to promote the innovation, development and popularization of carbon nitride materials.

In order to solve the technical problems, the following one or more embodiments of the present invention provide the following technical solutions:

In a first aspect, the present invention provides carbon nitride based composite ceramic tool materials, the raw materials comprise carbon nitride, titanium carbonitride, molybdenum, nickel and cobalt, and a weight ratio (%) of carbon nitride, titanium carbonitride, molybdenum, nickel and cobalt is 40 to 70:20 to 45:2 to 8:2 to 8:2 to 8.

With carbon nitride as a matrix phase, reinforcing phase and sintering aids need to be added to ensure the mechanical properties of the carbon nitride based composite ceramic tool materials. The present invention, after research, shows that when titanium carbonitride is used as a reinforcing phase, a type of sintering aids added has a greater effect on the mechanical properties of the carbon nitride based composite ceramic tool materials, and at this time, when molybdenum, nickel and cobalt are used as sintering aids, the mechanical properties of the carbon nitride based composite ceramic tool materials are guaranteed.

In the second aspect, the present invention provides a method for preparing the carbon nitride based composite ceramic tool materials, comprising the following steps:
ball milling carbon nitride, titanium carbonitride, molybdenum, nickel and cobalt, respectively;
mixing the ball milled raw material powders in a set ratio, ball milling and drying the powders to obtain the mixed materials;
vacuum hot press sintering the mixed materials to obtain carbon nitride based composite ceramic tool materials.

The present invention uses carbon nitride as the matrix phase and titanium carbonitride as the reinforcing phase added to the carbon nitride based composite ceramic materials, with molybdenum, nickel and cobalt as the sintering aids, and prepares dense composite tool materials by vacuum hot press sintering method, thus improving the mechanical properties of the carbon nitride based composite ceramic tool materials.

In the third aspect, the present invention provides a cutting tool, prepared from the nitride carbon based composite ceramic tool materials.

Compared with the prior art, one or more of the above technical solutions of the present invention achieves the following beneficial effects:

The equipment used in the present invention is simple and safe, the preparation method is stable, the operation and handling is simple, and the production efficiency is high. The method prepares a new carbon nitride based composite ceramic tool materials with carbon nitride as the matrix phase of the composite ceramic materials, by adding the reinforcing phase and optimizing the material composition ratio, sintering temperature, heat and pressure preservation time and other parameters, which is a new application of carbon nitride in the field of ceramic tool materials.

With the advantages of low cost, high hardness, high bending strength and high fracture toughness, the carbon nitride based composite ceramic tool materials is an important way to promote the innovation, development and popularization of carbon nitride materials.

BRIEF DESCRIPTION OF THE DRAWINGS

FIG. 1 shows a SEM image of the carbon nitride based composite ceramic tool materials prepared in Example 1 of the present invention.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

An exemplary embodiment of the present invention provides carbon nitride based composite ceramic tool materials, the raw materials comprise carbon nitride, titanium carbonitride, molybdenum, nickel and cobalt, and the weight ratio (%) of carbon nitride, titanium carbonitride, molybdenum, nickel and cobalt is 40 to 70:20 to 45:2 to 8:2 to 8:2 to 8.

In the present invention, carbon nitride is used as the matrix phase, titanium carbonitride as the reinforcing phase, and molybdenum, nickel and cobalt as metal phase sintering aids. Research shows that the mechanical properties of the carbon nitride based composite ceramic tool materials obtained with the above raw materials have superior mechanical properties, thus enabling the use of carbon nitride as the matrix phase for the preparation of ceramic tools.

In some embodiments, the weight ratio (%) of carbon nitride, titanium carbonitride, molybdenum, nickel, and cobalt is 48 to 63:25 to 40:3 to 5:3 to 5:3 to 5.

In some embodiments, the particle size of carbon nitride is 1 to 5 μm.

In some embodiments, the particle size of titanium carbonitride is 0.5 to 1.5 μm.

In some embodiments, the particle size of molybdenum is 0.5 to 1.5 μm.

In some embodiments, the particle size of nickel is 0.5 to 1.5 μm.

In some embodiments, the particle size of cobalt is 0.5 to 1.5 μm.

A second embodiment of the present invention provides a method for preparing the carbon nitride based composite ceramic tool materials, comprising the following steps:

Ball milling carbon nitride, titanium carbonitride, molybdenum, nickel and cobalt, respectively.

Mixing and drying the ball milled raw material powders in a set ratio to obtain mixed materials.

Vacuum hot press sintering of the mixture materials to obtain the carbon nitride based composite ceramic tool material.

In some embodiments, a ball milling medium for separate ball milling of carbon nitride, titanium carbonitride, molybdenum, nickel and cobalt is anhydrous ethanol. The addition of anhydrous ethanol gives the material a certain degree of fluidity and viscosity and acts as a dispersant; moreover, the anhydrous ethanol will completely evaporate during the drying process of the ball to milled materials, leaving no residue.

Further, the time duration for ball milling of the raw materials of carbon nitride, titanium carbonitride, molybdenum, nickel and cobalt is 60 to 72 h.

Further, a drying temperature of the raw material powders after ball milling is 100 to 120° C.

Further, the dried raw material powders are sieved through a 100 mesh.

Further, the medium for mixed ball milling is anhydrous ethanol, so as to make the mixing of each phase material more uniformly.

The vacuum hot press sintering described in the present invention refers to that a process of compression molding and then sintering is carried out under vacuum conditions. In some embodiments, the processing conditions of vacuum hot press sintering are: heating from 15-25° C. to 950-1050° C. at a heating rate of 40 to 60° C./min, while pressurizing to 7.5 to 8.5 MPa; then heating to 1450 to 1600° C. at a heating rate of 15 to 35° C./min, while pressurizing uniformly to 28 to 35 MPa; heat and pressure preservation time is 15 to 85 min. A temperature can be 1445 to 1455° C., 1495 to 1505° C., 1545 to 1555° C. or 1595 to 1600° C. at a heating rate of 15 to 35° C./min. A heat and pressure preservation time after heating to 1450 to 1600° C. and pressurizing can be 15 to 25 min, 35 to 45 min, 55 to 65 min, or 75 to 85 min.

Further, the processing conditions for hot press sintering are: heating from 20° C. to 1000° C. at a heating rate of 50° C./min while pressurizing to 8 MPa; then heating to 1450° C., 1500° C., 1550° C. or 1600° C. at a heating rate of 30° C./min while pressurizing uniformly to 32 MPa; heat and pressure preservation time is 20 min, 40 min, 60 min or 80 min.

In some embodiments, after the sintering is completed, the sintered materials are cooled with the furnace to obtain carbon-nitride based composite ceramic tool materials.

A third embodiment of the present invention provides a cutting tool, prepared from the above nitride carbon-based composite ceramic tool materials.

Example 1

1) Raw material powders of carbon nitride, titanium carbonitride, molybdenum, nickel and cobalt are respectively ball milled with anhydrous ethanol as the medium, and the ball milling is carried out on a roller ball mill, wherein the carbon nitride powder is ball milled for 72 h to disperse larger agglomerated particles and obtain a powder with an uniform particle size of 5 μm; the titanium carbonitride powder is ball milled for 72 h to disperse the larger agglomerated particles and obtain a powder with an uniform particle size of 0.5 μm; molybdenum powder is ball milled for 72 h to disperse larger agglomerated particles and obtain a powder with an uniform particle size of 0.5 μm; nickel powder is ball milled for 72 h to disperse larger agglomerated particles and obtain a powder with an uniform particle size of 0.5 μm; cobalt powder is ball milled for 72 h to disperse larger agglomerated particles and obtain a powder with an uniform particle size of 0.5 μm, the ball milled powder are all vacuum dried after ball milling at the drying temperature of 120° C., and sieved through 100 mesh, and the sieved powder is encapsulated for use;

2) According to an attached parameter table of the embodiment, 63% weight ratio of carbon nitride powder with a particle size of 5 μm, 25% weight ratio of titanium carbonitride powder with a particle size of 0.5 μm, 4% weight ratio of molybdenum powder with a particle size of 0.5 μm, 4% weight ratio of nickel powder with a particle size of 0.5 μm, 4% weight ratio of cobalt powder with a particle size of 0.5 μm, are poured into a mixing tank, adding anhydrous ethanol as the medium, and are ball milled in the ball mill for 48 h to mix all the phase materials uniformly. The composite ceramic materials are vacuum dried at 120° C. and sieved through 100 mesh to obtain a well-dispersed composite ceramic material powder, and is encapsulated for use;

3) The mixed composite ceramic material powder is put into a graphite mold, and then into a vacuum hot press sintering furnace. In a vacuum environment, adopt hot press sintering method at an uniform pressure; heating from 20° C. to 1000° C. at a heating rate of 50° C./min while pressurizing to 8 MPa; then heating to 1600° C. at a heating rate of 30° C./min while pressurizing uniformly to 32 MPa; heat and pressure preservation time is 60 min; cooling to 20° C. with the furnace, the carbon nitride based composite ceramic tool materials is obtained, as shown in FIG. 1, the tool material has a dense organization with fine and uniform crystal particle.

The experiment parameters of the embodiment are shown in table 1.

TABLE 1

| Example | Weight Ratio of the Components wt. % | | | | | Sintering | | |
|---|---|---|---|---|---|---|---|---|
| | carbon nitride | titanium carbonitride | molybdenum | nickel | cobalt | Temperature/ °C. | Holding Time/min | Pressure/ MPa |
| 1 | 63 | 25 | 4 | 4 | 4 | 1600 | 60 | 32 |
| 2 | 58 | 30 | 4 | 4 | 4 | 1600 | 60 | 32 |
| 3 | 53 | 35 | 4 | 4 | 4 | 1600 | 60 | 32 |
| 4 | 48 | 40 | 4 | 4 | 4 | 1600 | 60 | 32 |

Example 2

1) Raw material powders of carbon nitride, titanium carbonitride, molybdenum, nickel and cobalt are respectively ball milled with anhydrous ethanol as the medium, and the ball milling is carried out on a roller ball mill, wherein the carbon nitride powder is ball milled for 72 h to disperse larger agglomerated particles and obtain a powder with an uniform particle size of 5 μm; the titanium carbonitride powder is ball milled for 72 h to disperse the larger agglomerated particles and obtain a powder with an uniform particle size of 0.5 μm; molybdenum powder is ball milled for 72 h to disperse larger agglomerated particles and obtain a powder with an uniform particle size of 0.5 μm; nickel powder is ball milled for 72 h to disperse larger agglomerated particles and obtain a powder with an uniform particle size of 0.5 μm; cobalt powder is ball milled for 72 h to disperse larger agglomerated particles and obtain a powder with an uniform particle size of 0.5 μm, the ball milled powder are all vacuum dried after ball milling at the drying temperature of 120° C., and sieved through 100 mesh, and the sieved powder is encapsulated for use;

2) According to the attached parameter table of the embodiment, 58% weight ratio of carbon nitride powder with a particle size of 5 μm, 30% weight ratio of titanium carbonitride powder with a particle size of 0.5 μm, 4% weight ratio of molybdenum powder with a particle size of 0.5 μm, 4% weight ratio of nickel powder with a particle size of 0.5 μm, 4% weight ratio of cobalt powder with a particle size of 0.5 μm, are poured into the mixing tank, adding anhydrous ethanol as the medium, and are ball milled in the ball mill for 48 h to mix all the phase materials uniformly. The composite ceramic materials are vacuum dried at 120° C. and sieved through 100 mesh to obtain a well-dispersed composite ceramic material powder, and is encapsulated for use;

3) The mixed composite ceramic material powder is put into a graphite mold, and then into a vacuum hot press sintering furnace. In a vacuum environment, adopt hot press sintering method at an uniform pressure; heating from 20° C. to 1000° C. at a heating rate of 50° C./min while pressurizing to 8 MPa; then heating to 1600° C. at a heating rate of 30° C./min while pressurizing uniformly to 32 MPa; heat and pressure preservation time is 60 min; cooling to 20° C. with the furnace, the carbon nitride based composite ceramic tool material is obtained.

The experiment parameters of the embodiment are shown in table 1.

Example 3

1) Raw material powders of carbon nitride, titanium carbonitride, molybdenum, nickel and cobalt are respectively ball milled with anhydrous ethanol as the medium, and the ball milling is carried out on a roller ball mill, wherein the carbon nitride powder is ball milled for 72 h to disperse larger agglomerated particles and obtain a powder with an uniform particle size of 5 μm; the titanium carbonitride powder is ball milled for 72 h to disperse the larger agglomerated particles and obtain a powder with an uniform particle size of 0.5 μm; molybdenum powder is ball milled for 72 h to disperse larger agglomerated particles and obtain a powder with an uniform particle size of 0.5 μm; nickel powder is ball milled for 72 h to disperse larger agglomerated particles and obtain a powder with an uniform particle size of 0.5 μm; cobalt powder is ball milled for 72 h to disperse larger agglomerated particles and obtain a powder with an uniform particle size of 0.5 μm, the ball milled powder are all vacuum dried after ball milling at the drying temperature of 120° C., and sieved through 100 mesh, and the sieved powder is encapsulated for use;

2) According to the attached parameter table of the embodiment, 53% weight ratio of carbon nitride powder with a particle size of 5 μm, 35% weight ratio of titanium carbonitride powder with a particle size of 0.5 μm, 4% weight ratio of molybdenum powder with a particle size of 0.5 μm, 4% weight ratio of nickel powder with a particle size of 0.5 μm, 4% weight ratio of cobalt powder with a particle size of 0.5 μm, are poured into the mixing tank, adding anhydrous ethanol as the medium, and are ball milled in the ball mill for 48 h to mix all the phase materials uniformly. The composite ceramic materials are vacuum dried at 120° C. and sieved through 100 mesh to obtain a well-dispersed composite ceramic material powder, and is encapsulated for use;

3) The mixed composite ceramic material powder is put into a graphite mold, and then into a vacuum hot press sintering furnace. In a vacuum environment, adopt hot press sintering method at an uniform pressure; heating from 20° C. to 1000° C. at a heating rate of 50° C./min while pressurizing to 8 MPa; then heating to 1600° C. at a heating rate of 30° C./min while pressurizing uniformly to 32 MPa; heat and pressure preservation time is 60 min; cooling to 20° C. with the furnace, the carbon nitride based composite ceramic tool material is obtained.

The experiment parameters of the embodiment are shown in table 1.

Example 4

1) Raw material powders of carbon nitride, titanium carbonitride, molybdenum, nickel and cobalt are respectively ball milled with anhydrous ethanol as the medium, and the ball milling is carried out on a roller ball mill, wherein the carbon nitride powder is ball milled for 72 h to disperse larger agglomerated particles and obtain a powder with an uniform particle size of 5 μm; the titanium carbonitride powder is ball milled for 72 h to disperse the larger agglomerated particles and obtain a powder with an uniform particle size of 0.5 μm; molybdenum powder is ball milled for 72 h to disperse larger agglomerated particles and obtain a powder with an uniform particle size of 0.5 µm; nickel powder is ball milled for 72 h to disperse larger agglomerated particles and obtain a powder with an uniform particle size of 0.5 µm; cobalt powder is ball milled for 72 h to disperse larger agglomerated particles and obtain a powder with an uniform particle size of 0.5 µm, the ball milled powder are all vacuum dried after ball milling at the drying temperature of 120° C., and sieved through 100 mesh, and the sieved powder is encapsulated for use;

2) According to the attached parameter table of the embodiment, 48% weight ratio of carbon nitride powder with a particle size of 5 µm, 40% weight ratio of titanium carbon nitride powder with a particle size of 0.5 µm, 4% weight ratio of molybdenum powder with a particle size of 0.5 µm, 4% weight ratio of nickel powder with a particle size of 0.5 µm, 4% weight ratio of cobalt powder with a particle size of 0.5 µm, are poured into the mixing tank, adding anhydrous ethanol as the medium, and are ball milled in the ball mill for 48 h to mix all the phase materials uniformly. The composite ceramic materials are vacuum dried at 120° C. and sieved through 100 mesh to obtain a well-dispersed composite ceramic material powder, and is encapsulated for use;

3) The mixed composite ceramic material powder is put into a graphite mold, and then into a vacuum hot press sintering furnace. In a vacuum environment, adopt hot press sintering method at an uniform pressure; heating from 20° C. to 1000° C. at a heating rate of 50° C./min while pressurizing to 8 MPa; then heating to 1600° C. at a heating rate of 30° C./min while pressurizing uniformly to 32 MPa; heat and pressure preservation time is 60 min; cooling to 20° C. with the furnace, the carbon nitride based composite ceramic tool material is obtained.

The experiment parameters of the embodiment are shown in table 1.

Comparative Example 1

A difference with Example 1 is that titanium carbonitride is omitted and the rest is the same as that in Example 1.

Comparative Example 2

A difference with Example 1 is that molybdenum is omitted and the rest is the same as that in Example 1.

Comparative Example 3

A difference with Example 1 is that nickel is omitted and the rest is the same as that in Example 1.

Comparative Example 4

A difference with Example 1 is that cobalt is omitted and the rest is the same as that in Example 1.

The mechanical properties of the carbon nitride based composite ceramic tool materials prepared in examples 1 to 4 and comparative example 1 to 4 are shown in Table 2, and shows that a Vickers hardness, bending strength, and fracture toughness of the embodiments are greatly improved.

TABLE 2

|  | Vickers Hardness/GPa | Bending Strength/MPa | Fracture Toughness/ MPa · m$^{1/2}$ |
| --- | --- | --- | --- |
| Example 1 | 13.3 | 1015 | 7.15 |
| Example 2 | 13.5 | 1036 | 7.89 |
| Example 3 | 13.9 | 1076 | 8.45 |
| Example 4 | 14.0 | 1090 | 8.75 |
| Comparative example 1 | 7.2 | 453 | 4.21 |
| Comparative example 2 | 12.7 | 966 | 7.6 |
| Comparative example 3 | 12.9 | 899 | 7.9 |
| Comparative example 4 | 12.8 | 933 | 8.0 |

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

The invention claimed is:

1. Carbon nitride based composite ceramic tool materials, wherein raw materials of the tool materials comprise carbon nitride, titanium carbonitride, molybdenum, nickel and cobalt, and a weight ratio of carbon nitride, titanium carbonitride, molybdenum, nickel and cobalt is 40 to 70:20 to 45:2 to 8:2 to 8:2 to 8.

2. The materials according to claim 1, wherein the weight ratio of carbon nitride, titanium carbonitride, molybdenum, nickel and cobalt is 48 to 63:25 to 40:3 to 5:3 to 5:3 to 5.

3. The materials according to claim 1, wherein a particle size of carbon nitride is 1 to 5 µm;
or, a particle size of titanium carbonitride is 0.5 to 1.5 µm;
or, a particle size of molybdenum is 0.5 to 1.5 µm;
or, a particle size of nickel is 0.5 to 1.5 µm;
or, a particle size of cobalt is 0.5 to 1.5 µm.

4. A method of preparing the carbon nitride based composite ceramic tool materials according to claim 1, the method comprising:
ball milling carbon nitride, titanium carbonitride, molybdenum, nickel and cobalt, respectively, to make raw material powders;
mixed ball milling and drying the raw material powders in a set ratio to obtain mixed materials; and
vacuum hot press sintering the mixed materials.

5. The method according to claim 4, wherein ball milling medium of the ball milling of carbon nitride, titanium carbonitride, molybdenum, nickel and cobalt is anhydrous ethanol.

6. The method according to claim 5, wherein ball milling time of the raw materials of carbon nitride, titanium carbonitride, molybdenum, nickel and cobalt is 60 to 72 h.

7. The method according to claim 4, wherein a medium of the mixed ball milling is anhydrous ethanol.

8. The method according to claim 4, wherein conditions of the vacuum hot press sintering are: heating from 15-25° C. to 950-1050° C. at a heating rate of 40 to 60° C./min, while pressurizing to 7.5 to 8.5 MPa; then heating to 1450 to 1600° C. at a heating rate of 15 to 35° C./min, while the pressure is uniformly increased to 28 to 35 MPa; and a heat and pressure preservation time is 15 to 85 min.

9. The method according to claim 4, wherein after the hot press sintering, the materials are cooled with a furnace, and the nitride carbon based composite ceramic cutting tool materials are obtained.

10. A cutting tool, wherein the cutting tool is prepared from nitride carbon based composite ceramic tool materials according to claim 1.

11. The method according to claim 4, wherein after the ball milling, the raw material powders are dried at a drying temperature of 100 to 120° C., and subsequently the dried raw material powders are sieved through a 100 mesh.

12. The method according to claim 4, wherein conditions of the vacuum hot press sintering are: heating from 20° C. to 1000° C. at a heating rate of 50° C./min, while pressurizing to 8 MPa; then heating to 1450° C. to 1600° C. at a heating rate of 30° C./min, while pressurizing uniformly to 32 MPa; and a heat and pressure preservation time is 20 min, 40 min, 60 min or 80 min.

* * * * *